US00RE45643E

(19) United States
(12) Reissued Patent
Hallikainen et al.

(10) Patent Number: US RE45,643 E
(45) Date of Reissued Patent: Aug. 4, 2015

(54) MESSAGING SERVICE SYSTEM AND METHOD TO BE PERFORMED IN SUCH A SYSTEM

(75) Inventors: Aaro Hallikainen, Espoo (FI); Michael Rooke, Hyvinkää (FI); Teppo Savinen, Vihti (FI); Timo Meuronen, Espoo (FI)

(73) Assignee: Vringo, Inc., New York, NY (US)

(21) Appl. No.: 13/952,232

(22) Filed: Jul. 26, 2013

Related U.S. Patent Documents

Reissue of:
(64) Patent No.: 7,986,422
Issued: Jul. 26, 2011
Appl. No.: 10/296,891
PCT Filed: Jun. 16, 2000
PCT No.: PCT/EP00/05577
§ 371 (c)(1),
(2), (4) Date: Jul. 14, 2003
PCT Pub. No.: WO01/97504
PCT Pub. Date: Dec. 20, 2001

(51) Int. Cl.

| | |
|---|---|
| ***G06F 3/12*** | (2006.01) |
| ***G06K 15/02*** | (2006.01) |
| ***G06F 15/16*** | (2006.01) |
| ***H04N 1/00*** | (2006.01) |
| ***H04N 1/32*** | (2006.01) |

(52) U.S. Cl.
CPC ..... *G06F 3/1268* (2013.01); *G06F 3/1203* (2013.01); *G06F 3/1238* (2013.01); *G06F 3/1285* (2013.01); *H04N 1/00281* (2013.01); *H04N 1/00318* (2013.01); *H04N 1/00838* (2013.01); *H04N 1/32128* (2013.01); *H04N 2201/0015* (2013.01); *H04N 2201/0034* (2013.01); *H04N 2201/3242* (2013.01); *H04N 2201/3278* (2013.01)

(58) Field of Classification Search
None
See application file for complete search history.

(56) References Cited

U.S. PATENT DOCUMENTS

| | | | | | |
|---|---|---|---|---|---|
| 4,910,765 | A * | 3/1990 | Matsuse et al. | ..... | 379/100.09 |
| 5,200,991 | A * | 4/1993 | Motoyanagi | ..... | 455/465 |
| 5,671,277 | A * | 9/1997 | Ikenoue et al. | ..... | 713/179 |
| 5,793,416 | A * | 8/1998 | Rostoker et al. | ..... | 348/14.13 |
| 6,020,915 | A * | 2/2000 | Bruno et al. | ..... | 348/14.09 |
| 6,072,595 | A * | 6/2000 | Yoshiura et al. | ..... | 358/400 |
| 6,108,522 | A * | 8/2000 | Blanke | ..... | 455/39 |
| 6,240,403 | B1 * | 5/2001 | Shah et al. | ..... | 705/408 |

(Continued)

FOREIGN PATENT DOCUMENTS

| | | | |
|---|---|---|---|
| EP | 713321 | A1 * | 5/1996 |
| EP | 830010 | A2 * | 3/1998 |
| EP | 860985 | A2 * | 8/1998 |
| EP | 989733 | A1 * | 3/2000 |
| WO | WO 0197504 | A1 * | 12/2001 |

*Primary Examiner* — Scott A Rogers
(74) *Attorney, Agent, or Firm* — Cozen O'Connor

(57) ABSTRACT

The invention relates to a method and a Messaging Service system which includes one or more Messaging Service terminals and a control means being adapted for communication with a printing means. The Messaging Service terminal is adapted to send a message to the control means, which message contains a print-related information section and a message content section representing the message content. The print-related information section contains print-related information and designates the delivery of the message content section to the printing means or to a second Messaging Service terminal. The system is preferably implemented as a Multimedia Messaging Service (MMS) system. The message content section may represent one or more images. The print-related information section is preferably contained in a header of the message, and may contain authorization information related to printing or copying rights for printing or copying the message content, preferably the image or images represented by the message content section, by the second Messaging Service terminal.

36 Claims, 5 Drawing Sheets

(56) References Cited

U.S. PATENT DOCUMENTS 6,327,600 B1 * 12/2001 Satoh et al. ..... 715/207
6,509,975 B1 * 1/2003 Motegi ..... 358/1.14
6,553,240 B1 * 4/2003 Dervarics ..... 455/566
6,671,813 B2 * 12/2003 Ananda ..... 726/3
6,867,873 B1 * 3/2005 Han ..... 358/1.12
6,914,691 B1 * 7/2005 Sato ..... 358/1.15
6,990,548 B1 * 1/2006 Kaylor ..... 710/305

* cited by examiner

MESSAGING SERVICE SYSTEM AND METHOD TO BE PERFORMED IN SUCH A SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*REFERENCE TO RELATED APPLICATIONS*

*This is a Reissue of U.S. Pat. No. 7,986,422 which is a national stage of application No. PCT/EP00/05577, filed on Jun. 16, 2000.*

FIELD OF THE INVENTION

The invention relates to a messaging service system, preferably a Multimedia Messaging Service (MMS) system in which messages can be transmitted which contain an information section and a message content section such as an image section. Such a MMS system is suitable for transmitting information of multimedia type such as images (e.g. photographs), audio information and also pure text or graphic information. The invention furthermore relates to a method for transmitting messages containing an information section and a message content section, e.g. an image data section.

BACKGROUND OF THE INVENTION

Messaging services are frequently used for swiftly sending messages e.g. between mobile phones. As an example, SMS (Short Message System) messages can be sent from one user equipment such as a mobile station (for instance mobile phone) to another user equipment which may be a mobile or stationary network component.

MMS (Multimedia Messaging Service) provides an advanced messaging service which is able to send multimedia-type information such as images, audio data or the like from one equipment to another equipment. The multimedia messaging service (MMS) is a system application which allows a WAP (Wireless Application Protocol) client to provide a messaging operation with a variety of media types. The WAP defines a specification for developing applications operating over wireless communication networks. A user may therefore send multimedia messages over a WAP equipment such as a mobile terminal. Such messages can then be displayed on a display of the receiving equipment, e.g. a mobile terminal. Although this type of messaging service is beneficial in that it allows the sending of a variety of different types of data, it nevertheless is subject to some restrictions regarding usability.

SUMMARY OF THE INVENTION

The invention is providing a system and/or an improved functionality of a messaging service.

According to one aspect of the invention, a Messaging Service system is provided which includes at least one first Messaging Service terminal and a control means being adapted for communication with a printing station, the first Messaging Service terminal being adapted to send an image message to the control means, the message containing a print-related information section and a message content section representing the message content, wherein the print-related information section contains print-related information and designates the delivery of the message content section to the printing station or to a second Messaging Service terminal.

Furthermore, the invention provides, according to another aspect, a method to be performed in a Messaging System, in particular a Multimedia Messaging Service (MMS) system, including at least one first Messaging Service terminal and a control means being adapted for communication with a printing station, the first terminal sending a message to the control means, wherein the message contains a print-related information section and a message content section representing the message content, preferably one or more images, the print-related information section containing print-related information and designating the delivery of the message content to the printing station or to a second Messaging Service terminal.

Some preferred implementation details of the invention are defined in the dependent claims.

The present invention provides a messaging service wherein the messages contain print-related information section. The print-related information preferably indicates whether printing of the message contents such as one or more images is allowed or prohibited. The print-related information may also indicate print restrictions such as maximum number of allowed prints of the message. The print-related information may also indicate a desired printing of the message content requested by the sending terminal. This print-related information section provides an additional functionality to the messaging service in that it allows, restricts or inhibits a printing of the message contents.

Such an additional functionality is in particular of advantage in a multimedia messaging service (MMS) which is adapted to send images such as graphic pictures or photographs in addition to other information such as pure text information. However, the invention may also be implemented in a messaging service of other type such as SMS (Short Message Service), or USSD (Unstructured Supplementary Service Data) messages.

A system or a method in accordance with the invention allows a user to deliver and print e.g. images such as photographs preferably taken by using a digital camera, the images being printable on a suitable hard copy output device. Such a hard copy output device e.g. includes printers of any type such as a personal photo quality color printer, an internal company printer connected via e.g. an Ethernet LAN (Local Area Network); or a user-specified developing and printing service.

The images may be taken using any kind of imaging, preferably digital imaging. The image capturing device can be a MMS terminal, a digital camera or any other suitable type of imaging device. Image processing such as filtering, reduction and/or interpolation of the image may be performed before printing the image. The printing services used for printing the image can be a traditional or digital print processing house. The printed images may be transferred from or to the print ordering station by any suitable method such as wireless data transfer or galvanic transport.

As an example, a MMS user may have taken a picture using a multimedia terminal, and transferred the image to a MMS center (MMSC) which serves as control means or server of the MMS system. Via this MMSC, the image is delivered to the recipient specified by the sender. When the recipient wants to print the received image, she/he may e.g. order a print from the originating user which can either explicitly give permission for printing one or more pictures sent to the MMSC, or may initially mark any sent image as being acceptable or prohibited to print. The recipient can then request a local or remote printing of the desired image.

The messaging service is thus extended to convey printing information, or other authorization data which preferably are included in the same message as the picture sent to the recipient. Images can therefore be marked or tagged for print. As an alternative, the image originator which will usually be the copyright holder, and the recipient can perform a negotiation before effecting any print of a transmitted image. According to the invention, the method of output, e.g. on a local printer or an external print service, can also be designated.

Images can be transmitted to a printer based on user-supplied profile data or direct indication of a printer address.

According to the present invention, manual steps for ordering the printing of images can be eliminated. The invention provides a solution preferably for multimedia terminals able to capture images, and to send images directly to a printer system for printing (e.g. either to a local printer or to an external printing service).

In accordance with one of the aspects of the invention, the originating terminal (e.g. MMS terminal) can indicate, during upload of the image, whether the image is to be stored in the messaging service server for subsequent processing and/or printing.

Furthermore, according to another aspect of the invention, the printing information is preferably embedded inside a messaging service message such as a MMS message. Possible printing information may include: permission to view only, permission to print once or several times up to a defined upper limit; size of print; print quality; printer address; payment method, etc.

The negotiation process performed between the originating and receiving users (terminals) may lead to the embedding of the negotiated and accepted printing parameters in the initial image uploaded to the messaging service center, including information relating to e.g. charging, constraints on printing, routing information indicating the requested printer, etc. In such a case, the negotiation process may be performed before actually transmitting a picture to the receiving terminal.

According to the invention, a print-specific payload may be included in any operation or message to/from a user equipment and the associated server. The payload, e.g. the print header, may contain the address and parameters defining where to output/send and print the message. This can be realized by the addition of one or more print-related fields to the message such as the MMS message. When a print is requested after the message has already been delivered to the receiving terminal, the MMS message may include a print field indicating the state such as the print request, which message is sent to the originating terminal. A print-request primitive may be provided to indicate this request. Likewise, a print-status response will be provided which indicates "printing allowed/prohibited/restricted". When the print rights are defined by the sending MMS terminal beforehand, the message sent by the originating user contains a print header which already contains all print right fields.

This concept may also be applied for printing messages of other type such SMS messages which may then be redirected directly to a printer such a local desktop printer, if available.

In a preferred embodiment, a user may directly specify a print service which is selected for printing the transmitted image or images. The printer-specifying information is relayed to the control means such as MMSC via a specific "print command" request. A response from the control means may inform the user on the print authorization and conditions such as the price for printing the image or images. This information can be encapsulated and sent as a print order via a messaging service such as MMS or e-mail.

When uploading an image to another terminal, the sending terminal preferably indicates if the image is to be stored by the control means for further processing and printing.

The invention provides enhanced print services in that print information is embedded inside a messaging service message, preferably a MMS (Multimedia Messaging Service) message. Furthermore, such print-related information may also specify that the control means is to store the complete message, or at least the message content such as one or more images, even after delivery to the recipient. Therefore, when the recipient subsequently wishes to print the message, e.g. the image, it is only necessary to inform the control means of the printing request which thereupon performs the necessary steps such as transmitting the image to a printing device or service.

In accordance with a preferred aspect of the invention, print-related information such as printing information, printing/copyright/cost/printer address information or information on from where, whom to get the printing permission, is embedded inside the message such as MMS message itself when the message is first sent.

The print-related information section is preferably contained in a header of the message. Such header is usually provided for indicating the addresses of the sender and recipient and is therefore only to be extended so as to include information field(s) for the print-related information. Hence, no additional message is to be sent for the print-related information, and the existing messaging service can be used without need of specifying new standards. Merely the definition of the information section has to be specified so as to provide one or more additional fields for the print-related information.

The print-related information may contain authorization information. The recipient and/or control means thus are informed on the printing or copying rights related to the transferred message content such as the image or images. When the print-related information indicates inhibition to print, general allowability, or printing only up to an upper limit such as e.g. five prints of the original, no additional signaling and message communication with the sender is necessary. The recipient merely has to request, if printing is allowed, a printing service, either directly or via the control means, to make and deliver the intended prints.

Preferably, the control means is adapted to store the print-related information such as authorization information and is thus able to check it for print permission when the recipient is requesting a print. This structure reduces the signaling and messaging load of the network.

When the recipient desires to print the received message content such as text, graphic or image such as a photograph, and the print-related information indicates a necessary communication with the sending terminal in order to clarify print conditions, the control means informs the sending terminal on the intended print, and receives therefrom data specifying the print conditions or restrictions such as maximum number of allowable prints, costs for printing the image and the like. Hence, the sending terminal is, in this case, not forced to specify all printing conditions in his first message but may deliver or specify them only after receipt of a query indicating a desire to print the sent image.

Preferably, the control means comprises a memory for storing the message contents such as one or more images received from the first terminal and transmitted to the second terminal. When the second terminal is issuing a print command to the control means, it is unnecessary to transmit the image data from the recipient terminal or sending terminal to the control means. This reduces the total amount of traffic occurring in the network.

The printing station may be an external printing station which e.g. is specifically adapted for printing images such as color photographs with high quality.

The invention is furthermore characterized in that the network components such as the terminals and/or the control means are adapted to perform the functions as defined above and in the following description. Therefore, the network components as such are likewise to be considered as representing independent implementations of the invention.

DETAILED DESCRIPTION OF PREFERRED EMBODIMENTS OF THE INVENTION

Figure 1:
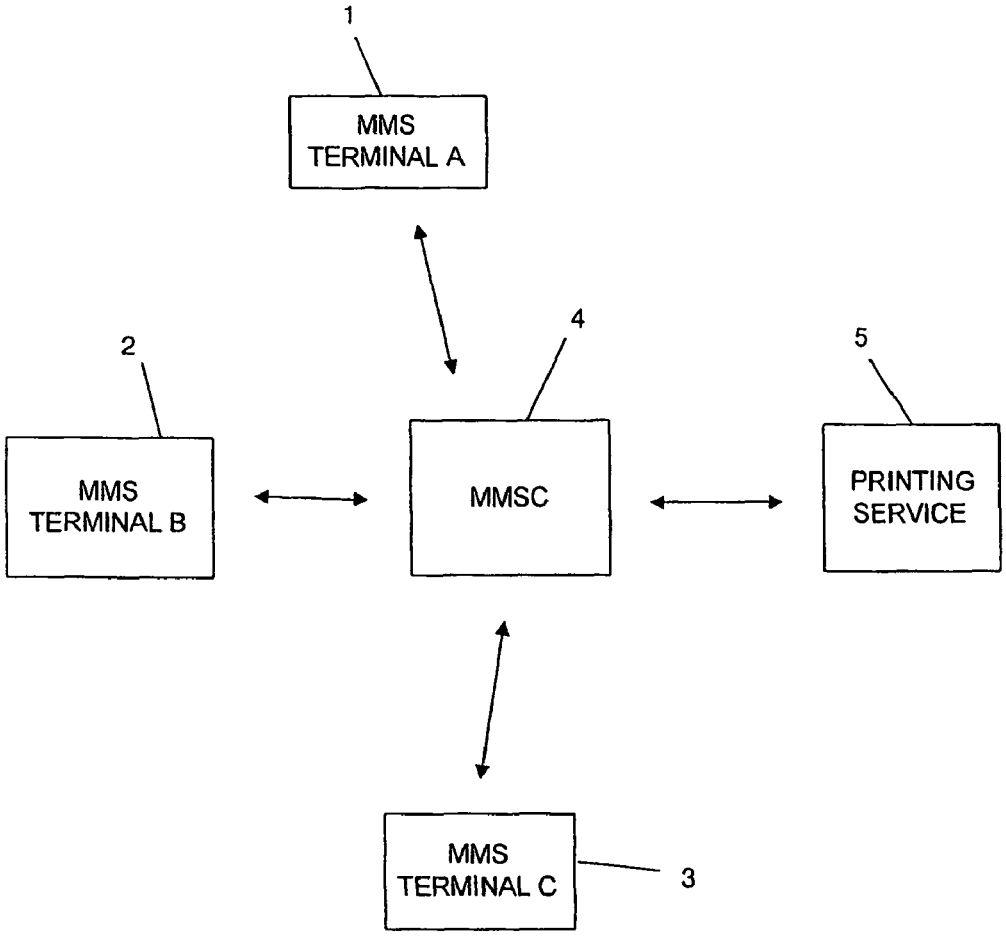
FIG. 1 shows a basic concept of a MMS system.

FIG. 1 shows a schematic representation of a network such as a communication network or a data network which is adapted to perform a messaging service, in particular a MMS (Multimedia Messaging Service). In another embodiment (not shown), the system may be adapted to perform a messaging service of another type such as SMS or USSD. The system comprises several terminals 1 to 3 (terminals A, B, C) which are implemented as MMS terminals able to send and/or receive messages of multimedia type. The system furthermore comprises one or more control means 4 which here is implemented as a MMS controller (MMSC) or MMS server.

The system furthermore comprises, or cooperates with, a printing service 5 which may be a local printer or an external printing service, for example.

Figure 2:
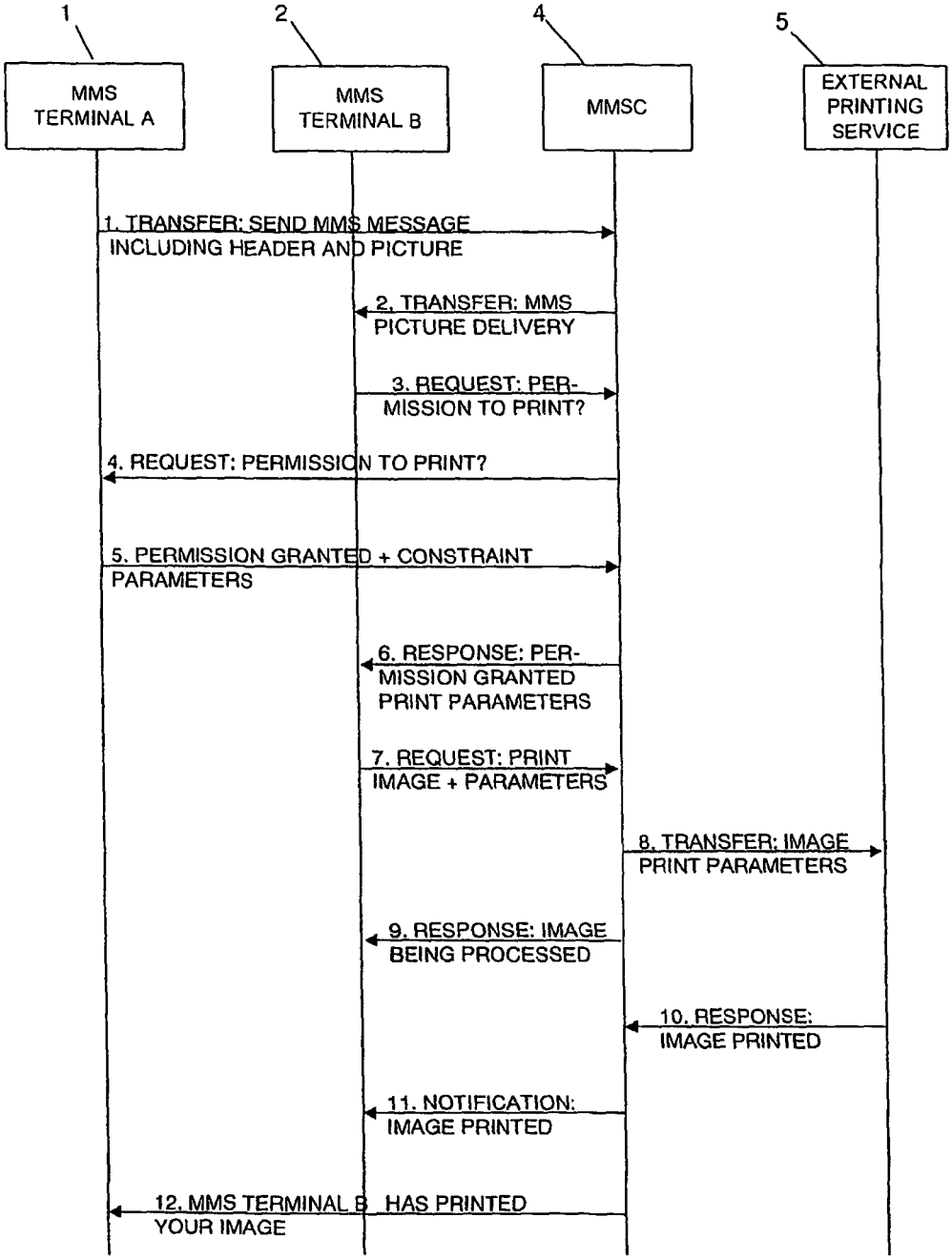
FIG. 2 illustrates an embodiment of a method and message flow according to the invention.

FIG. 2 shows details of a messaging method for sending and returning messages from a first user to a second user in a case where a recipient (second user) of an image requests a hardcopy (print) of the received image. According to FIG. 2, the user of MMS terminal 1 (MMS terminal A) sends an MMS message to MMS terminal 2 (terminal B) via the MMS server (MMSC 4).

Although the term "image" is used here, this term is to include pictures of any kind such as graphic representations, sketches and the like. This image may be sent in or as the MMS message with MIME content type (MIME=Multipurpose Internet Mail Extension) such as e.g. JPEG image.

The steps and messages shown in FIG. 2 will be described below in detail referring to the numbering attached to the individual messages of FIG. 2. In step 1., the MMS terminal 1 originating an image or picture, sends this image or picture to the MMS terminal 2 using the multimedia messaging service. The MMS message originated from terminal 1 includes a header containing print-related information, and the picture data. This MMS message is first directed to the MMS server 4 which transfers, in step 2., the received message to the MMS terminal 2 based on the recipient address indicated in the MMS message. After viewing the received image, the user of the MMS terminal 2 decides, in the present example, to print the image, if allowed, and therefore sends, in step 3., a request message to MMS server 4 inquiring on the permission to print.

In step 4., the request sent in step 3. is transferred, by MMS server 4, to the originating MMS terminal 1 either in unchanged manner or in translated form such as a text (or other type such as special indication) message.

MMS terminal 1 checks the requested permission to print and, after deciding thereon, sends a response which, in the present example, is the message shown in step 5., i.e. a message "permission granted+constraint parameters". The constraint parameters may e.g. represent limitations on the maximum number of allowable prints, the size of prints, the print resolution etc. If no constraints are provided, the constraint parameters need not be sent or may by set to zero or default value. This message sent to MMS server 4 in step 5. is transferred to the MMS terminal 2 as a response which indicates "permission granted" and eventually may include print parameters according to any constraint parameters, if provided.

In step 7., the MMS terminal 2, after deciding on the print parameters, if any, and the acceptance thereof, sends a request message to the MMS server 4 requesting a print of the image and eventually indicating additional parameters which may define a printer to be used and/or user profile issues.

The MMS server 4 selects an appropriate printer or printing server and, in the case of FIG. 2, sends a message to the external printing service 5 transferring the image and print parameters to the printing service 5 (step 8.). Furthermore, in the step 9., the MMS server 4 sends a confirmation to MMS terminal 2 stating that the image is being processed, i.e. that printing is performed.

When the external printing service 5 has completed the printing job, it sends a message to the MMS server 4 confirming that the image has been printed (step 10.). Thereafter, the MMS server 4 sends a notification (step 11.) to the MMS terminal 2 informing it on the effected print, and eventually additionally sends a message (step 12.) to the originating MMS terminal 1 informing same on the print of the image by MMS terminal 2.

In the notification sent in 11., the MMS server 4 may also inform MMS terminal 2 on the location where the printed image is waiting for being collected, in particular in a case when several different printers are available for printing.

FIG. 2 represents a case wherein the MMS terminal 1 grants the print permission. If permission should not be granted, the response (step 5.) of MMS terminal 1 to the print permission request of steps 3. and 4. is "permission not granted". This response is sent to MMS terminal 2 in step 6. Thereafter, any eventual print requests of MMS terminal 2 will fail. As an alternative, the constraint parameters sent in message 5. may allow a print only once. In this case, the user of MMS terminal 2 is informed, in step 6., that permission to print is given only once. Such restrictions are preferably stored in MMS server 4. When the user of MMS terminal 2 requests print of the picture received in step 2., such a print request is server only once. Any subsequent print requests are rejected by MMS server 4.

Alternatively, the constraint parameters may also indicate an upper limit of allowable number of prints such as five prints. The MMS server 4 then sets a counter counting the number of prints of the image requested by MMS terminal 2. When the maximum allowable number is reached, all subsequent printing requests are rejected. When the print permission should be given for multiple prints without any upper limit, the user of MMS terminal 2 is informed, in step 6., that the image can be printed as many times as desired.

The constraint parameters of message 5. may include additional or other parameters such as allowed printing resolution. This may in particular be of importance for professional images where print permission may be given for low resolution printing only, or for high quality professional printing. Fees charged for these different printing possibilities may be negotiated or may be fixed and will depend on the decision of the user of MMS terminal 1 having the copyright of the image in question.

During the "request print" negotiation phase, the MMS terminal 1 may also state, in the message sent in step 5., price/charging information as one of the constraint parameters. Additionally, the MMS terminal 1 may wish to stenographically embed a digital water mark in the image so that the copyright holder, i.e. in this case the user of MMS terminal 1, can be identified. For further details regarding the embedding of watermarks, see EP 0 862 318 A2.

The response of step 5. may include information regarding the size or quality of image the user of MMS terminal 2 is allowed to print. For example, full reproduction of an art work may not be allowed. As an alternative or additional feature, cryptographic information may be passed to allow subsequent decryption and printing by the user of the MMS terminal 2. Such a feature enhances the security against unallowed copying or reproduction of an image by third parties, or by the user of MMS terminal 2, e.g. when trying to print an image exceeding the printing rights granted to the user of MMS terminal 2.

The print image request sent in step 7. may be used to perform a printer discovery and/or indicate a print user profile. The request sent in step 7. may contain specific routing/addressing information indicating which printer should print the image. As an example, the image may be further transferred, e.g. via e-mail, to a print server on the user's corporate LAN (local area network). This print server may provide a special print service. In such a case, the request message of step 7. preferably contains additional information such as the address of the machine to transfer the image to, and the alphanumeric name or address of the printer.

In case the user of MMS terminal 2 does not wish, or is unable to, directly indicate the printer to be used, the print service preferably uses a default printer from which the printed image or images is/are then to be collected. For example, a command "print to:" may be left blank in the message of step 7. which means the use of the default printer.

When an external print service is used, additional information is preferably carried inside the message in a secure way, e.g. in encrypted manner, for example the user's name, address, print quantity, output size, payment method, etc.

Figure 3:
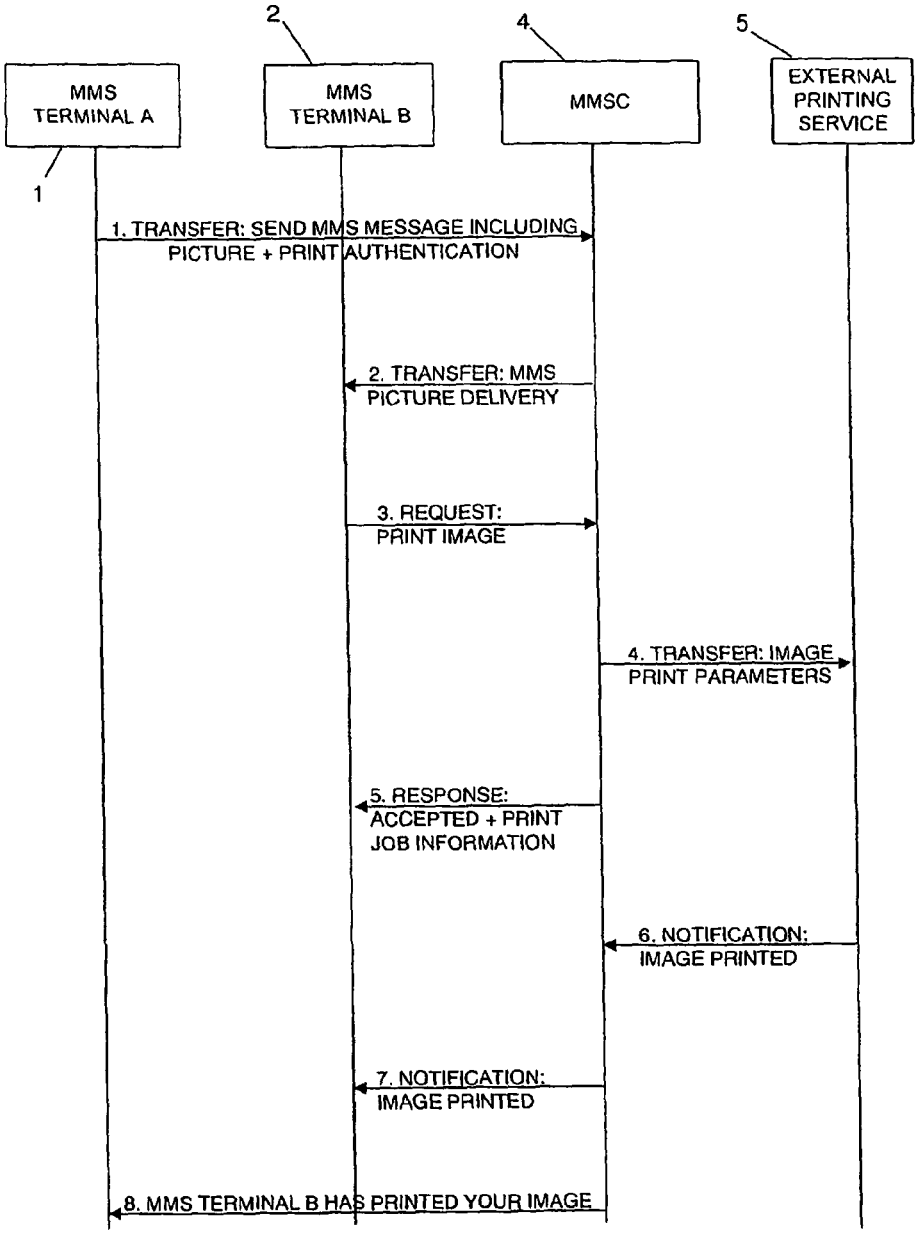
FIG. 3 shows another embodiment of a method and structure incorporating another type of message flow.

FIG. 3 shows a further embodiment of a network and system in accordance with the invention. Here again, a case is assumed in which MMS terminal 1 (terminal A) sends a MMS message including picture or image data to MMS terminal 2 (terminal B). In the case of FIG. 3, the MMS message sent from MMS terminal 1 contains, in addition to the message content section representing the image or images to be sent to MMS terminal 2, a print-related information section which includes or represents print authentication data. This print authentication information defines the conditions for granting access and the print rights for eventually printing the image, and is included by the originating terminal 1 into the message sent to server 4, preferably into the header of the message.

When the recipient terminal 2 requests one or more hardcopies (prints) of the transmitted image, no permission request and response messages are to exchanged because permission (and conditions, if any) to print is already defined during the initial delivery of the image from the originating terminal 1 to the server 4. Hence, steps 3. to 6. of FIG. 2 can be omitted leading to a reduction of the signaling and traffic load of the network components handling such messages. Steps 3. to 8. of FIG. 3 essentially correspond to steps 7. to 12. of FIG. 2. In step 5. of FIG. 3, the response may include additional print job information signaling the printer or printing service used for printing the image (informing the user where to collect the print), charge information for printing charges, and the like.

Such inclusion of print authentication information into the MMS message offers an easy access determination to works such as copyright-protected works, e.g. images. The copyright owner can easily define the copy protection of the image and may either give permission to print the image, or mark it as view-only, i.e. not printable, etc.

In step 1. of FIG. 3, the message sent from MMS terminal A to the MMS server 4 includes the print authentication information as embedded information. The print authentication information defines print parameters relating to restrictions e.g. which persons are allowed to print the image.

The print authentication information, and/or the dialogue performed according to steps 3. to 6. of FIG. 2 which relates to "permission to print image" can be extended so as to include transfer of charging information. In this case, the print authentication information, or response, issued from the originating terminal 1 (assumed to be handled by the copyright holder) will indicate the costs charged for printing. If the recipient terminal 2 (user) requests to print the image, the user of terminal 2 will be billed based on the charge information set by the user of terminal 1.

The transferring of charging information can be reduced to a "print profile" or "print charging profile" for each user, in particular each recipient user. In such a case, the MMS server 4 preferably comprises a set of tariff clauses which are used to inform the recipient user about the charges. This relieves the originating user of terminal 1 from specifically setting a desired monetary unit amount. Such a strategy may be well compatible with current charging gateways of networks such as GSM networks.

Figure 4:
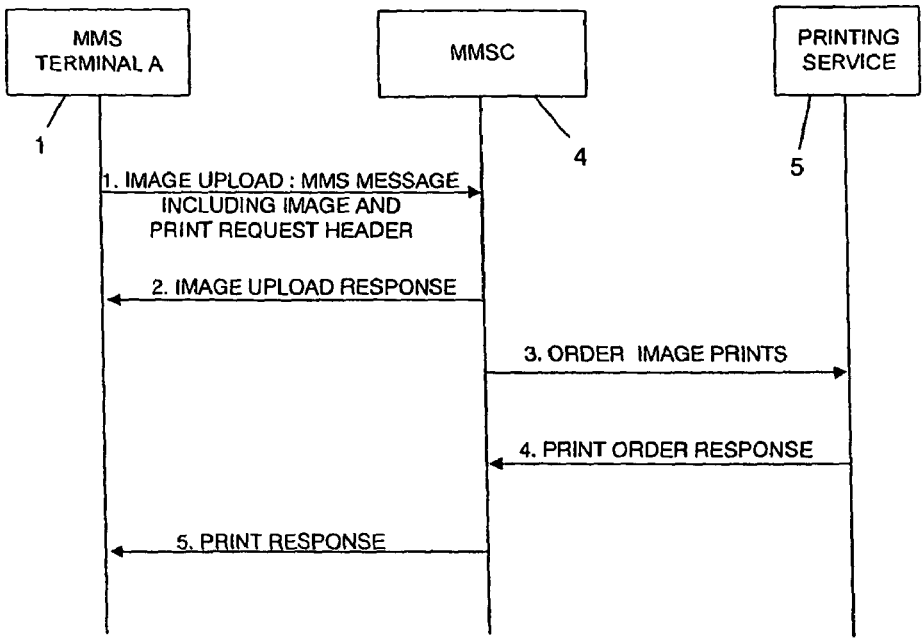
FIG. 4 illustrates another embodiment of the invention.

FIG. 4 shows another embodiment involving only one MMS terminal 1, the MMS server 4 and a printing service 5. In the case shown in FIG. 4, the terminal 1 directly requests the printer service 5 to print the image. In step 1., the MMS terminal 1 performs an image upload to the MMS server 4 by sending an MMS message which includes the image data and print-related information which here is a print request header. This print request header contains parameters related to the printing, which parameters are embedded in the image upload. The MMS server 4 confirms receipt of the message of step 1. by sending an image upload response in step 2. Further, in step 3. the MMS server 4 sends the MMS message, i.e. the image or picture, to the printing service 5 indicated by the user in the print request header. Any suitable format such as "Digital Print Order Format" may be used by the MMS terminal 1 or MMS server 4 to mark each image to be printed. The system may also use a proprietary format for marking the images to be printed.

According to FIG. 4, the print parameters are embedded in the initial image upload to the MMS server 4, as performed in step 1. Therefore, no other additional message is to be sent from MMS terminal 1 for ensuring a correct print.

In step 3., the MMS server 4 sends the image contents to the printing service 5 and requests print of the images in the appropriate format. In particular in a case where several images are contained in the image upload message of step 1., the order of printing thereof may be specifically defined. Alternatively, the images may be printed in the order as received. The printing service 5 sends a print order response in step 4. confirming the print request. Finally, the MMS server 4 sends a print response, in step 5., to MMS terminal 1 informing the latter on the performed print.

Figure 5:
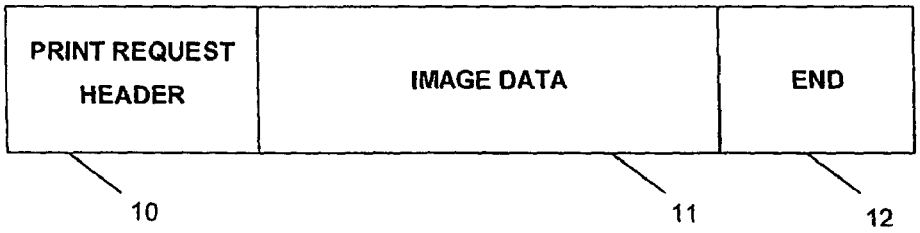
FIG. 5 shows the basic structure of a message sent from a first terminal to a second terminal and/or a control means, including a print request header.

FIG. 5 shows details of the structure of an embodiment of an MMS message which may be sent in steps 1. of FIGS. 2 to 4. The MMS message contains a print-related information section which here is represented by a print request header 10, a message content section which here is the image data section 11 representing the picture to be sent to another MMS terminal and/or to a printer or printing service. Moreover, the MMS message contains an end section 12 representing the end of message.

Figure 6:
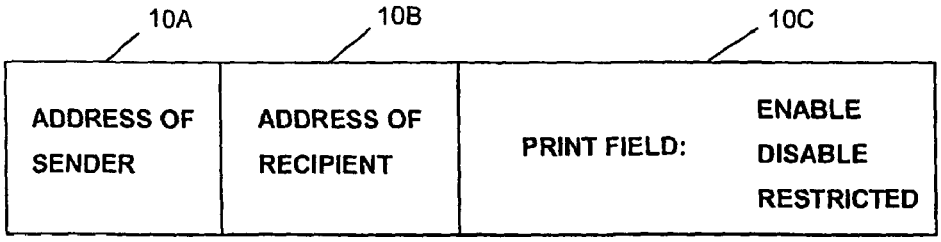
FIG. 6 shows details of the structure of the print request header of FIG. 5.

FIG. 6 shows further details of the print request header 10 of FIG. 5. The print request header 10 comprises an address field 10A representing the address of the sender (e.g. MMS terminal 1), a further address field 10B representing the address of the recipient (e.g. MMS terminal 2), and a print field 10C containing the print-related information. As shown in FIG. 6, the print field 10C may indicate the printing conditions such as "enable" (printing is permitted without restrictions); or "disable" (printing is not allowed); or "restricted" (printing is permitted on a restricted basis only or only after performing printing permission steps with the originating terminal 1 or the MMS server 4.

The originating user may give explicit permission for printing all pictures sent to an MMS server, or he can mark any individual image sent as being "OK to print", or containing "restrictions for print". A negotiation between two users (parties) of the MMS terminals may be performed, including designation of the method of output. The print service to be used may be specified by the user of the originating or receiving terminal. Such information is preferably relayed to the MMS server, and e.g. charge information is returned to a user (subscriber).

The print field shown in FIG. 6 may be provided as a specific extension of the message such as a MMS message. For instance, the "Send Request" table specified in "MMS Message Encapsulation Draft" of "WAP FORUM" may be extended to include the following fields:

"Print field:" enable: originator indicates allowance of printing so that recipient is free to use the work for printing;

disable: originator states printing is prohibited. Upon request, the originator may state "printing is allowed" as attachment to a response to a print request;

"restricted:" e.g. a counter may indicate how many times the message may be printed, or other protocol-specific rights may be indicated.

The print fields may additionally contain a field "format" which may be or include a specific identifier which identifies the print parameters which can be used. This field can also contain or define a link to further messages which may carry e.g. print information such as DPOF (Digital Print Order Format) information.

An additional field "print to" may be provided for indicating the address which defines the address of the printer or service to perform the print.

The above example of a print field is suitable e.g. for WAP MMS messages. Any other suitable language such as XML may likewise be used to carry the necessary information such as parameters.

E.g.

```
<DPDF>
  <NAME> an example of restricted content </NAME>
  <PRINT> Rights="Restricted/No" Reason </PRINT>
<DPDF>
```

Any suitable method such WAP message encapsulation can be used (after appropriate extension to include appropriate additional fields), and/or the fields/values may sent as a message content, e.g. a user multipart message encoded in an appropriate language such as XML.

Figure 7:
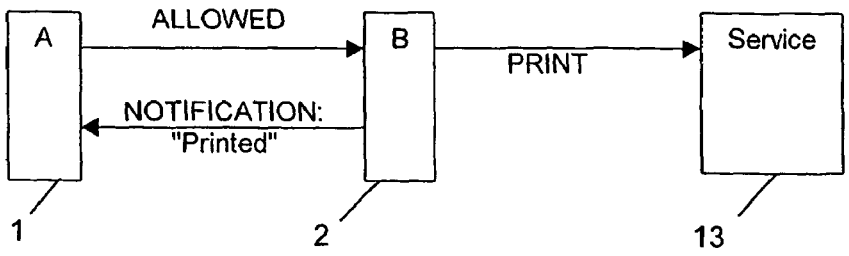
FIG. 7 illustrates a further embodiment of the invention in a simplified manner.

FIG. 7 shows a simplified example of exchange of messages wherein terminal 1 (A) is an originating mobile equipment and terminal 2 (B) is the terminating mobile equipment. The destination address is included in the MMS header. The use rights for the image/message are given in the PRINT field (print-related information section). Here, "allowed" is indicated. When terminal 2 intends to print the message, it transfers it to a service 13 which performs the print and/or processing of the image. After completion of the print, the terminal 2 is sending a notification "Printed" to terminal 1.

The message sent from terminal 1 to terminal 2 does not need to include a print destination. When the terminating mobile terminal forwards the message to the printing service 13, the print-destination will then be defined according to the selection of terminal 2.

Figure 8:
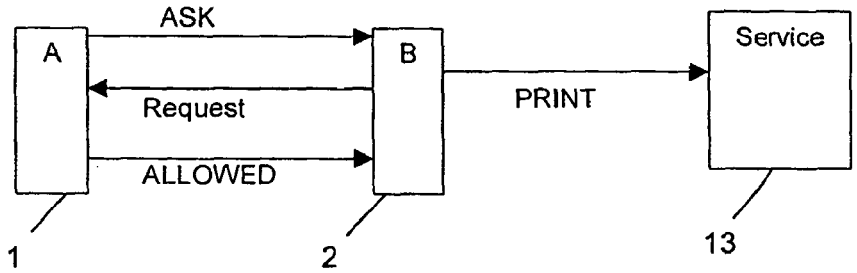
FIG. 8 shows another embodiment of the invention in a schematic representation.

FIG. 8 shows another case of printing wherein the print-related information section of the first message sent from terminal 1 to terminal 2 includes the indication "ASK", meaning that permission for printing has to be requested before actually being allowed to perform a print. When a print is desired, terminal 2 sends a request to terminal 1 requesting print permission. When terminal 1 allows the printing, it sends a response indicating "ALLOWED" to terminal 2. Terminal 2 then sends the image to the print service 13 or prints it directly, e.g. on a local printer (e.g. via an infrared port, or e.g. Bluetooth).

Figure 9:
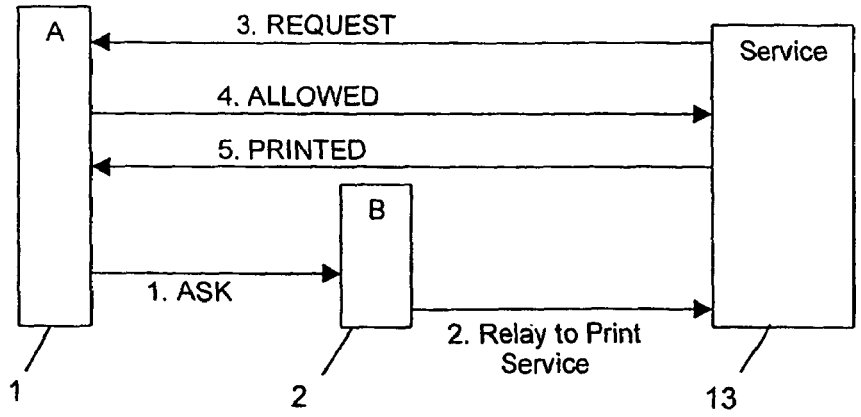
FIG. 9 shows a further embodiment of a message flow according to the invention.

FIG. 9 shows a case in which the print-related requests and responses are sent between service 13 and terminal 1. In step 1., the terminal 1 directly sends a message such as an image to terminal 2. This message includes the indication "ASK". Terminal 2 forwards this message to the printing service (step 2) when desiring the image to be printed. The service 13 requests print permission directly from terminal 1 by sending a respective request in step 3. Terminal 1 responds, in step 4., to this printing request by sending e.g. the information "printing allowed", step 4. The service 13 then prints the message, if allowed, and sends a confirmation to terminal 1 (step 5., PRINTED).

In such a case, the message sent from terminal 1 in step 1. may include an indication "print-destination" defining the print service 13 to be addressed by terminal 2 when desiring to print the message.

In the following, some specific examples of information sections of messages will be described. The words and/or values used below are illustrative examples only.

DPDF General Format

MMS Header Fields & Values (Where | means "or"; MO stands for originating terminal; and MT means terminating terminal)

Between terminals: MO-MT, MT-MO:

PRINT: ALLOWED |

FORBIDDEN |

RESTRICTED <COPIES>|

ASK |

REQUEST <Originators Address>Message ID

NOTIFICATION <Message>

To Service:

PRINT-Destination: ADDRESS|SERVICE

Note: REQUEST is used with an ASK directive.

ASK shall be used by the originating author.

REQUEST shall be used by the recipient to ask for printing permission.

NOTIFICATION may optionally be sent to the originating author.

ALLOWED/FORBIDDEN may also carry a reason why they are allowed or forbidden.

Printing Rights

Printing rights can be assigned WITH the message.

Examples below:

PRINT: RESTRICTED 5—Allows 5 prints of the image before the user terminal removes it.

PRINT: ALLOWED—Printing of the image/message is allowed at any time.

PRINT: FORBIDDEN—ALL Printing is forbidden. This means VIEW ONLY.

If "PRINT: RESTRICTED 0" is used, this is the same as PRINT FORBIDDEN.

PRINT: ASK—Terminating Terminal (Destination) Must Send PRINT: REQUEST

Printing rights can be assigned only AFTER destination terminal/service has requested them.

MO Sends Message with PRINT: ASK set.

MT Sends PRINT: REQUEST

MO Sends Print rights, that is PRINT: ALLOWED

PRINT: RESTRICTED

PRINT: FORBIDDEN etc.

Again the message content when sending any of the above values can indicate the REASON why the printing is allowed/restricted/forbidden.

PRINT-Destination: Address/Application

Example: address//server//printershare-name

Or IPV4: PORT

Or textual description of output device.

This is optionally carried in the MT case, however the recipient user will nearly always specify where he/she wants to print the messages.

In the MO case (with NO destination mobile) the PRINT-Destination is likely to be the MMS Destination address and is probably not needed here.

It can be used to further restrict output in the MO-MT case where its content can indicate "Service Only" thus the user is not allowed local output (laser printer) etc.

XML/PRINT Directive used with control information carried in XML Encoded message.

If the WAP Message Encapsulation Message protocol data units and fields are NOT used, then a PRINT directive or MIME type can be used to carry XML encoded data to achieve the same goal.

XML Coding Example:

Use Case 1:

```
<PrintInstructions>
  <Permission printing="Allowed"/>
</PrintInstructions>
<PrintInstructions>
  <Permission printing="Restricted" copies="5"> Copyright (C) 2000 Nokia Corporation
  </Permission>
</PrintInstructions>
```

Use Case 2:

```
<PrintInstructions>
  <Permission printing="Ask" Id="xxxxyyyy"> Copyright (C) 2000 Nokia Corporation
  </Permission>
</PrintInstructions>
```

Use Case 3:

A=Originator

B=Terminator

S=PrintService

[A->B], [B->S]

```
<PrintInstructions>
  <PrintPermission printing="Ask">
    <ImageId>xxxx:yyyy</ImageId>
    <RightsHolder>+358401234567</RightsHolder>
      Copyright (C) 2000 Nokia Corporation
  </PrintPermission>
</PrintInstructions>
```

[S->A]

```
<PrintInstructions>
  <PrintPermission printing="Request" copies="5">
    <ImageId>xxxx:yyyy</ImageId>
    <RightsHolder>+358401234567</RightsHolder>
      Copyright (C) 2000 Nokia Corporation
  </PrintPermission>
</PrintInstructions>
```

[A->S]

```
<PrintInstructions>
  <PrintPermission printing="Allowed" copies="1>
    <ImageId>xxxx:yyyy</ImageId>
    <RightsHolder>+358401234567</RightsHolder>
      Copyright (C) 2000 Nokia Corporation
  </PrintPermission>
</PrintInstructions>
```

Although the invention has been described by mainly referring to images transported as messages, the messages may also contain another message contents such as pure text. The invention is applicable to messages of any such type when it is intended or requested to print such messages.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

The invention claimed is:

1. Messaging Service system including comprising:

at least one first Messaging Service terminal and a control means being adapted for communication with a printing means, the first Messaging Service terminal being adapted to send a message to the control means, the message containing:

a print-related information section; and a message content section representing the message content, wherein the print-related information section contains print-related information and designates the delivery of the message content section to the printing means, when printing of the message content is desired, and to a second Messaging Service terminal, wherein the second Messaging Service terminal is adapted to send, when the second Messaging Service terminal desires to print the message content received from the first Messaging Service terminal, a print request to the control means which is adapted to respond thereto by sending a request to the first Messaging Service terminal inquiring on the permission to print, and to decide on the print request based on the answer received from the first Messaging Service terminal.

2. System according to claim 1 which is implemented as a Multimedia Messaging Service system, wherein the first and/or second Messaging Service terminal(s) is/are Multimedia Messaging Service (MMS) terminal(s).

3. System according to claim 1, wherein the message content section represents one or more images.

4. System according to claim 1, wherein the print-related information section is contained in a header of the message.

5. System according to claim 1, wherein the print-related information contains authorization information related to printing or copying rights for printing or copying the message content by the second Messaging Service terminal.

6. System according to claim 5, wherein the authorization information indicates the permission or prohibition to print the message content by the second Messaging Service terminal.

7. System according to claim 5, wherein the authorization information indicates the maximum allowed number of printing the message content by the second Messaging Service terminal.

8. System according to claim 5, wherein the control means is adapted to store the authorization information and to check it for print permission when the second Messaging Service terminal sends a print request.

9. System according to claim 1, wherein the control means comprises a memory for storing the message or message content received from the first Messaging Service terminal and transmitted to the second Messaging Service terminal.

10. System according to claim 1, wherein the printing means is an external printing station.

11. System according to claim 1, wherein the message content represents one or more photographs.

12. Method to be performed in a Messaging System, the Messaging System comprising:

at least one first Messaging Service terminal and a control means being adapted for communication with a printing means, the method comprising:

sending from the first terminal a message to the control means, which message contains:

a print-related information section; and a message content section representing the message content, the print-related information section containing print-related information and designating the delivery of the message content to the printing means, when printing of the message content is desired, and to a second Messaging Service terminal, wherein the second Messaging Service terminal sends, when the second Messaging Service terminal desires to print the message content received from the first Messaging Service terminal, a print request to the control means which responds thereto by sending a request to the first Messaging Service terminal inquiring on the print authorization, and by deciding on the print request based on the answer received from the first Messaging Service terminal.

13. Method according to claim 12, wherein the print-related information section is sent as a header of the message.

14. Method according to claim 12, wherein the print-related information section contains authorization information related to printing or copying rights for printing or copying the message content by the second Messaging Service terminal.

15. Method according to claim 14, wherein the authorization information indicates the permission or prohibition to print the image by the second Messaging Service terminal.

16. Method according to claim 14, wherein the authorization information indicates the maximum allowed number of printing the message content by the second Messaging Service terminal.

17. Method according to claim 14, wherein the authorization information is stored in the control means, and the stored authorization information is checked for print permission when the second Messaging Service terminal sends a print request.

18. Method according to claim 12, wherein the control means stores a message or message content received from the first Messaging Service terminal and transmitted to the second Messaging Service terminal.

19. Method according to claim 12, wherein the message content is printed on an external printing station.

20. Method according to claim 12, wherein the message content is a photograph.

21. A messaging service system, comprising:

a control means adapted for communication with a printing means, a first messaging service terminal and a second messaging service terminal, the control means further adapted to receive at least one message from the first messaging service terminal, the at least one message comprising:

a first section comprising print-related information; and a second section representing message content, wherein the first section comprising print-related information designates delivery of the second section representing message content to the printing means, when printing of the message content is desired, and the second messaging service terminal, wherein, when the first section comprising print-related information designates delivery to the second messaging service terminal, the control means is further adapted to:

a) send the second section representing message content to the second message service terminal;

b) receive a print request from the second message service terminal;

c) send a request to the first messaging service terminal inquiring on permission to print the message content;

d) receive an answer from the first messaging service terminal; and e) decide on the print request from the second message service terminal based on the answer received from the first messaging service terminal.

22. The messaging service system of claim 21, wherein at least one of the first and second messaging service terminals comprises a mobile phone.

23. A messaging service system, comprising:

a controller adapted for communication with a printer, a first terminal and a second terminal, the controller further adapted to receive at least one message from the first terminal, the at least one message comprising:

a first section comprising print-related information; and a second section representing message content, wherein the first section comprising print-related information designates delivery of the second section representing message content to the printer, when printing of the message content is desired, and the second terminal, wherein, when the first section comprising print-related information designates delivery to the second terminal, the controller is further adapted to:

a) send the second section representing message content to the second terminal;

b) receive a print request from the second terminal;

c) send a request to the first terminal inquiring on permission to print the message content;

d) receive an answer from the first terminal; and e) decide on the print request from the second terminal based on the answer received from the first terminal.

24. The messaging service system of claim 23, wherein at least one of the first and second terminals comprises a mobile phone.

25. A method, comprising:

receiving a message from a first terminal, the message comprising a first section comprising print-related information and a second section representing message content, the first section comprising print-related information designating delivery of the second section representing message content to a printer, when printing of the message content is desired, and a second terminal;

when the first section comprising print-related information designates delivery to the printer, printing at least the message content in response to receiving a request to print the message content; and when the first section comprising print-related information designates delivery to the second terminal:

a) send the second section representing message content to the second terminal;

b) receiving a print request from the second terminal;

c) sending a request to the first terminal inquiring on permission to print the message content;

d) receiving an answer from the first terminal; and e) deciding on the print request from the second terminal based on the answer received from the first terminal.

26. The method of claim 25, wherein the receiving of the message from the first terminal further comprises receiving the message from a mobile phone.

27. An apparatus, comprising:

an electronic device configured to:

receive a Multimedia Messaging Service (MMS) message, the MMS message containing a print-related information section and a message content section representing message content of the MMS message, the print-related information section containing print-related information and designating delivery of the message content; and when printing of the message content is desired, send a first print request, the first print request being responded to by a second print request sent inquiring on print authorization, and a decision on the first print request based on an answer received regarding the second print request.

28. The apparatus of claim 27, wherein the electronic device comprises a second Messaging Service terminal, and wherein the MMS message is received from a first Messaging Service terminal.

29. The apparatus of claim 28, wherein the second print request is sent to the first Messaging Service terminal, and wherein the answer is received from the first Messaging Service terminal.

30. The apparatus of claim 27, wherein the first print request is sent to a control means adapted for communication with a printing means to which the delivery of the message content is designated, when the printing of the message content is desired.

*31. The method of claim 12, further comprising sending print job information to the second Messaging Service terminal indicating at least one printer used for printing, a printing service used for printing, and charging information.*

*32. The method of claim 12, wherein the print-related information includes an identity of printer.*

*33. The method of claim 12 further comprising transmitting the content to a printer based on direct indication of printer address from terminal or user profile data.*

*34. The method of claim 12 further comprising transmitting a confirmation of receipt of the print request to the terminal.*

*35. The method of claim 12, wherein the print-related information is printing parameters.*

*36. The method of claim 35 wherein the print parameters is at least one of size of print, print quality, print address, and payment method.*

* * * * *